US005667240A

United States Patent [19]

Mitchell

[11] Patent Number: 5,667,240
[45] Date of Patent: Sep. 16, 1997

[54] AIR SPRING SUSPENSION THAT REDUCES DYNAMIC BRAKING LOADS ON THE AIR SPRING

[75] Inventor: James L. Mitchell, Springfield, Mo.

[73] Assignee: Ridewell Corporation, Springfield, Mo.

[21] Appl. No.: 494,182

[22] Filed: Jun. 23, 1995

[51] Int. Cl.6 .................. B60G 11/26; B60G 11/46
[52] U.S. Cl. .................. 280/712; 280/713; 267/256
[58] Field of Search .................. 280/713, 712, 280/711, 720, 718, 725, 716; 267/241, 256, 31, 32, 35

[56] References Cited

U.S. PATENT DOCUMENTS

| 2,869,891 | 1/1959 | Venditty et al. | 280/713 |
|---|---|---|---|
| 3,063,732 | 11/1962 | Harbers et al. | 280/712 |
| 3,233,915 | 2/1966 | Hamlet | 280/712 |
| 3,309,107 | 3/1967 | Chieger | 280/712 |
| 3,531,099 | 9/1970 | King | 280/712 |
| 3,612,572 | 10/1971 | Raidel | 280/712 |
| 3,794,344 | 2/1974 | Raidel | 267/256 |
| 4,114,923 | 9/1978 | Raidel | 280/711 |
| 4,181,323 | 1/1980 | Raidel | 280/711 |
| 4,500,112 | 2/1985 | Raidel | 280/702 |
| 4,518,771 | 5/1985 | Hedenberg | 280/711 |
| 4,529,224 | 7/1985 | Raidel | 280/711 |
| 4,530,515 | 7/1985 | Raidel | 280/683 |
| 4,596,402 | 6/1986 | Raidel | 280/711 |
| 4,711,465 | 12/1987 | Raidel | 280/712 |
| 4,714,269 | 12/1987 | Raidel | 280/702 |
| 4,756,550 | 7/1988 | Raidel | 280/713 |
| 4,773,670 | 9/1988 | Raidel, II | 280/713 |
| 4,858,948 | 8/1989 | Raidel | 280/711 |
| 4,900,057 | 2/1990 | Raidel | 280/713 |
| 5,013,063 | 5/1991 | Mitchell | 280/712 |
| 5,118,131 | 6/1992 | Manning | 280/713 |

*Primary Examiner*—Brian L. Johnson
*Assistant Examiner*—Peter C. English
*Attorney, Agent, or Firm*—Howell & Haferkamp, L.C.

[57] ABSTRACT

An air spring suspension system for vehicle axles reduces the dynamic force on the system's air springs during braking and acceleration of the vehicle and thereby prevents the diving of the vehicle chassis toward the road surface on application of the vehicle's brakes or acceleration of the vehicle.

20 Claims, 8 Drawing Sheets

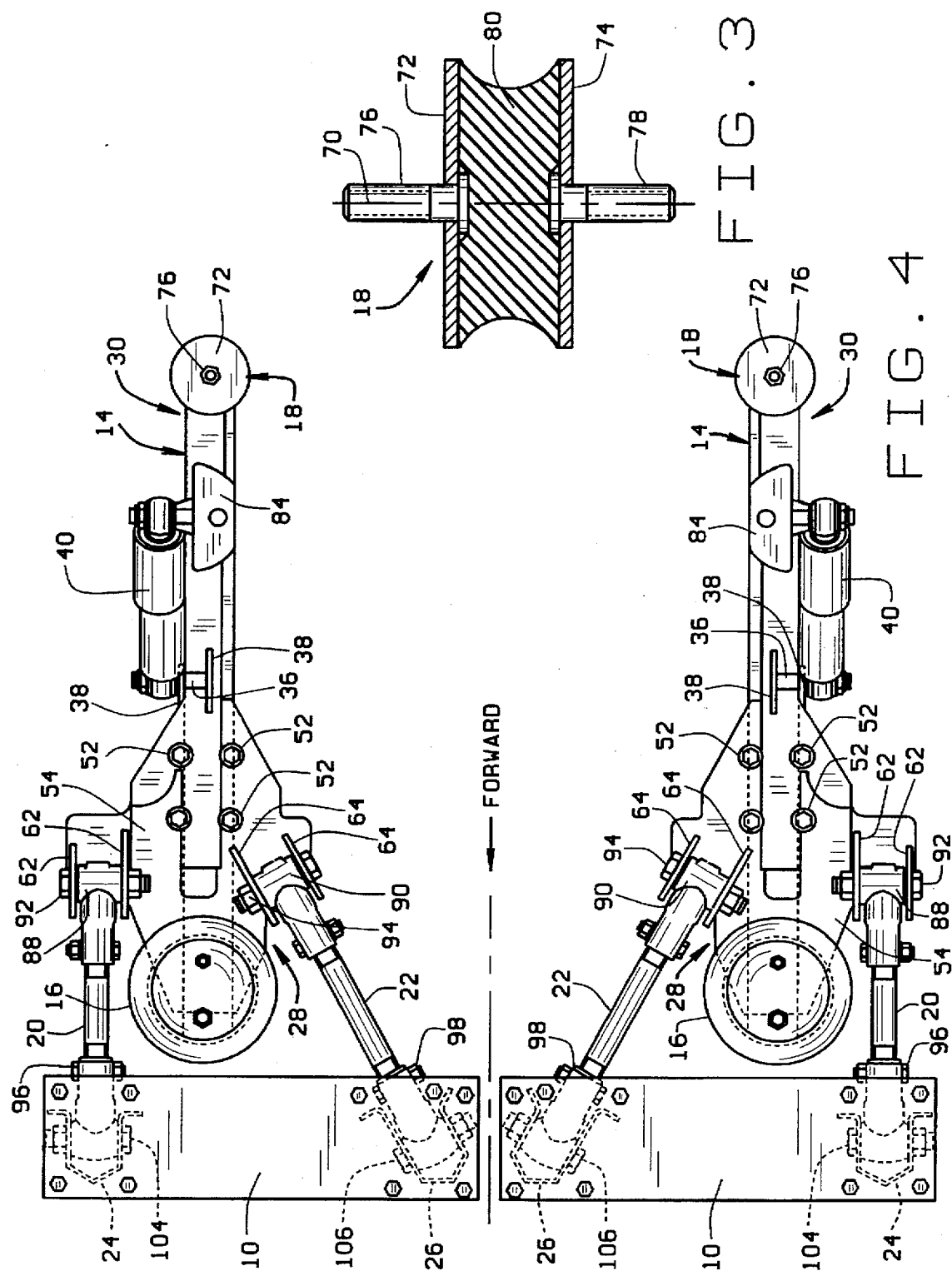

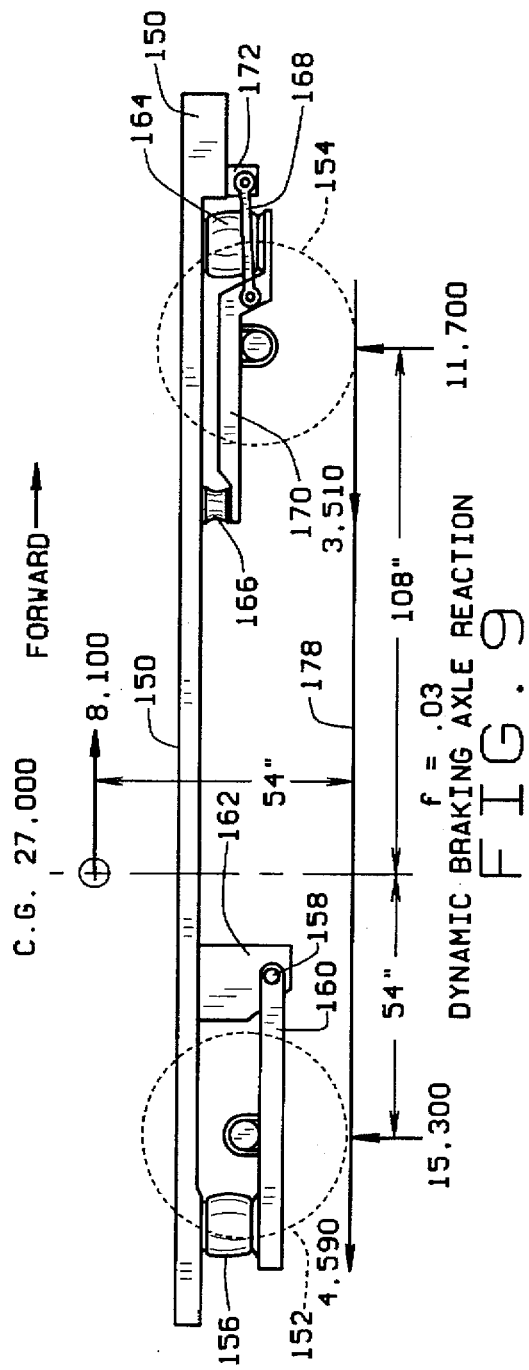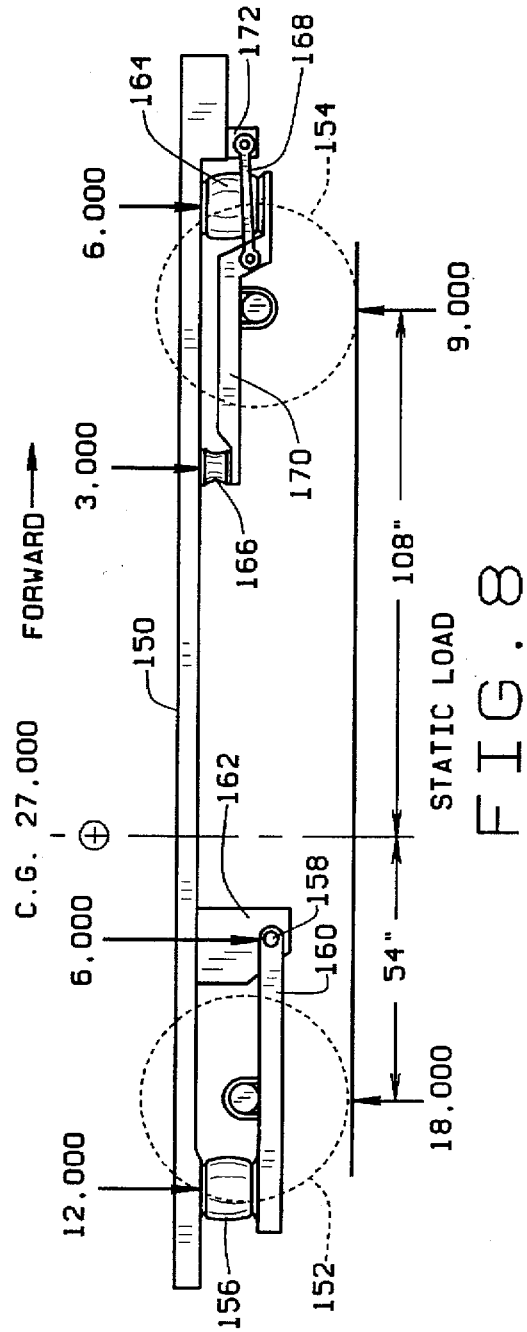

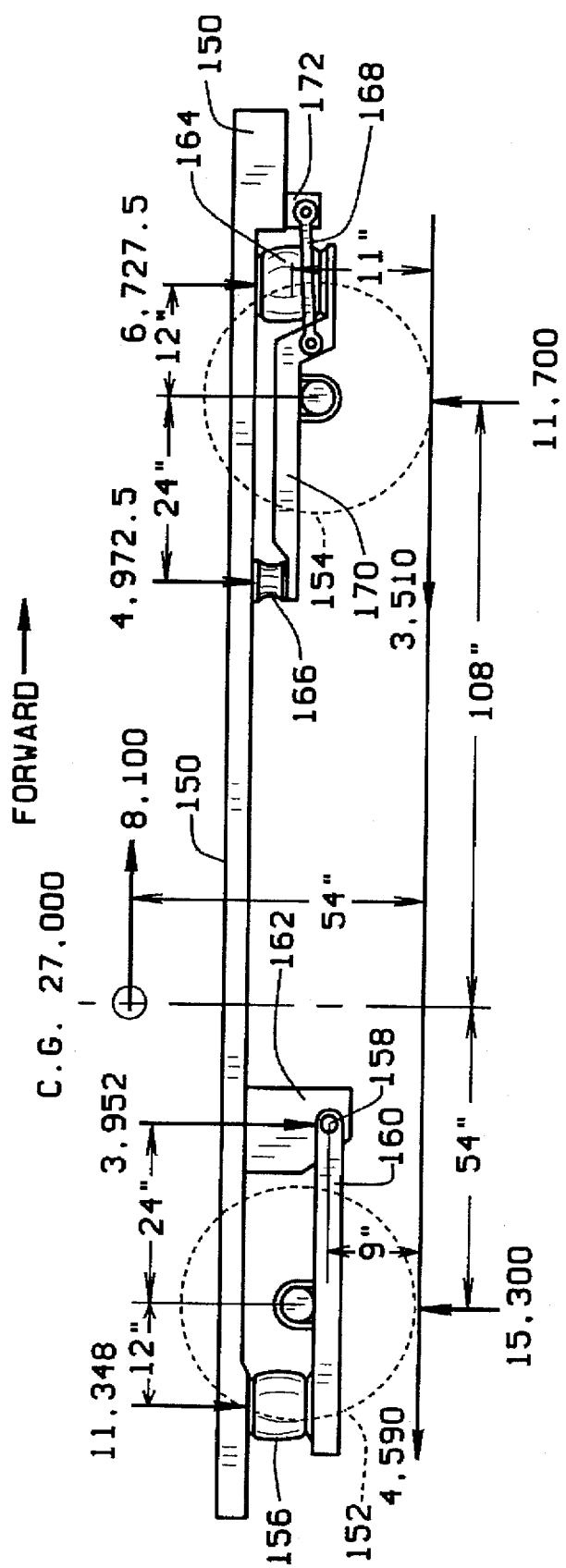

AIR SPRING SUSPENSION THAT REDUCES DYNAMIC BRAKING LOADS ON THE AIR SPRING

FIELD OF THE INVENTION

The present invention pertains to an air spring suspension system for vehicle axles that reduces the dynamic force on the system's air springs during braking and acceleration of the vehicle and thereby prevents the diving of the vehicle chassis toward the road surface on application of the vehicle's brakes or acceleration of the vehicle.

BACKGROUND OF THE INVENTION

A conventional torque beam air spring suspension system is basically comprised of a pair of hangers, a pair of torque beams and a pair of air springs. Each hanger of the pair is mounted on the opposite left and right sides of the vehicle's chassis. A forward end of each torque beam is mounted to a hanger for pivoting movement of the beam relative to the hanger and the vehicle chassis. Each beam extends rearwardly from a hanger to a rearward end of the beam. Each air spring of the pair is mounted between the vehicle chassis and the rearward end of one of the beams. An axle of the vehicle is mounted to each of the beams intermediate their connections to the hanger and the air spring.

A commonly experienced undesirable aspect of the operation of a conventional beam suspension system of this type is the occurrence of vehicle diving during application of the vehicle's brakes. Vehicle diving also takes place during acceleration of the vehicle from a standing stop. Vehicle diving is the occurrence of the abrupt lowering of the vehicle front end toward the roadway surface on application of the vehicle's brakes, and the lowering of the vehicle's rearward end on acceleration of a rear wheel drive vehicle from a stop. The occurrence of vehicle diving is particularly uncomfortable in vehicles specifically designed for transporting passengers.

In the prior art, suspension systems have been developed to reduce vehicle diving. However, these suspension systems are principally employed with vehicles having segmented axles, i.e. axles that do not extend entirely across the lateral width of a vehicle to the opposite left and right sides of the vehicle. In suspension systems for vehicle axles that extend entirely across the vehicle's lateral width to the opposite left and right sides of the vehicle, vehicle diving still remains a problem.

SUMMARY OF THE INVENTION

The suspension system of the invention is specifically designed to prevent the diving of a vehicle toward the roadway surface on application of the vehicle's brakes, and on acceleration of a rear wheel drive vehicle from a standing stop. The suspension system is designed to reduce the dynamic braking force exerted on the air springs of the suspension during braking of the vehicle, and thereby reduces the front end diving of the vehicle on application of its brakes. The suspension system also functions to reduce the dynamic acceleration force exerted on the air springs of the vehicle during vehicle acceleration, and thereby reduces vehicle diving during acceleration.

Each of the various embodiments of the suspension system of the invention is basically comprised of a torque beam having opposite forward and rearward ends, an air spring, a pair of radius rods and a mechanical connector, for example a connecting shackle, a metal-bearing pad or shackle wear plate, or in the preferred embodiment of the invention, a resilient, elastic buffer connector.

The suspension system differs from prior art suspensions principally in that the air spring of the system is positioned forwardly of the vehicle axle on the torque beam. In one construction of the system, the rearward end of the torque beam is connected to the vehicle chassis by the buffer connector. From the buffer connector, the torque beam extends toward the forward end of the vehicle chassis to a front end of the torque beam. The front end of the torque beam is connected to the vehicle chassis by the air spring mounted on the beam front end. The radius rods are also connected to the forward end of the torque beam forward of the vehicle axle. The radius rods extend forwardly from the torque beam front end to hangers secured to the vehicle chassis. The vehicle axle is secured to the beam intermediate its front and rearward ends. The suspension system of the invention may be employed with various types of vehicle axles, but its functioning in reducing vehicle diving on application of the vehicle's brakes is particularly useful with vehicle axles that extend entirely across the chassis of the vehicle.

In operation of the suspension system, the air spring and buffer connector support a portion of the vehicle's static load, the portion of the load depending on the center of gravity of the vehicle. On braking of the vehicle, due to the positioning of the air spring forwardly of the vehicle axle, the increase in the load supported by the air spring due to dynamic braking beam reactions is only slightly larger than the static load supported by the air spring, and is significantly less than the dynamic load supported by air springs of conventional suspension systems during vehicle braking. Because the specific design of the suspension system reduces the dynamic braking load exerted on the air spring, the diving of the vehicle toward the roadway during vehicle braking is significantly reduced.

The suspension system of the invention is principally designed for use on a front axle of a vehicle to reduce front end diving during vehicle braking. However, the suspension system of the invention is equally well-suited for use on the rear drive axle of a vehicle to reduce diving of the vehicle's rearward end during acceleration.

BRIEF DESCRIPTION OF THE DRAWINGS

Further objects and features of the present invention are revealed in the following detailed description of the preferred embodiment of the invention and in the drawing figures wherein:

FIG. 3 is an enlarged, cross-section view of the buffer connector of the suspension system shown in FIG. 1.

FIG. 4 is a plan view of the suspension system of FIG. 1.

FIGS. 8–10 are schematic representations of a vehicle chassis with the front axle mounted on the suspension system of the invention and the rear axle mounted on a conventional air spring suspension. These Figures illustrate the static and dynamic forces exerted on the suspension system of the invention during braking of a vehicle.

DESCRIPTION OF THE PREFERRED EMBODIMENT

FIGS. 1–7 show various embodiments of the suspension system of the invention. FIGS. 8–10 illustrate an example of the static load forces exerted on components of the suspension system and the dynamic braking load forces exerted on those components. FIGS. 8–10 illustrate only one example of the operation of the suspension system in reducing the front end diving of a vehicle due to dynamic braking forces. To better understand the operation of the suspension system illustrated in FIGS. 8–10, the various component parts of the different embodiments of the system will first be described with reference to FIGS. 1–7.

Figure 1:
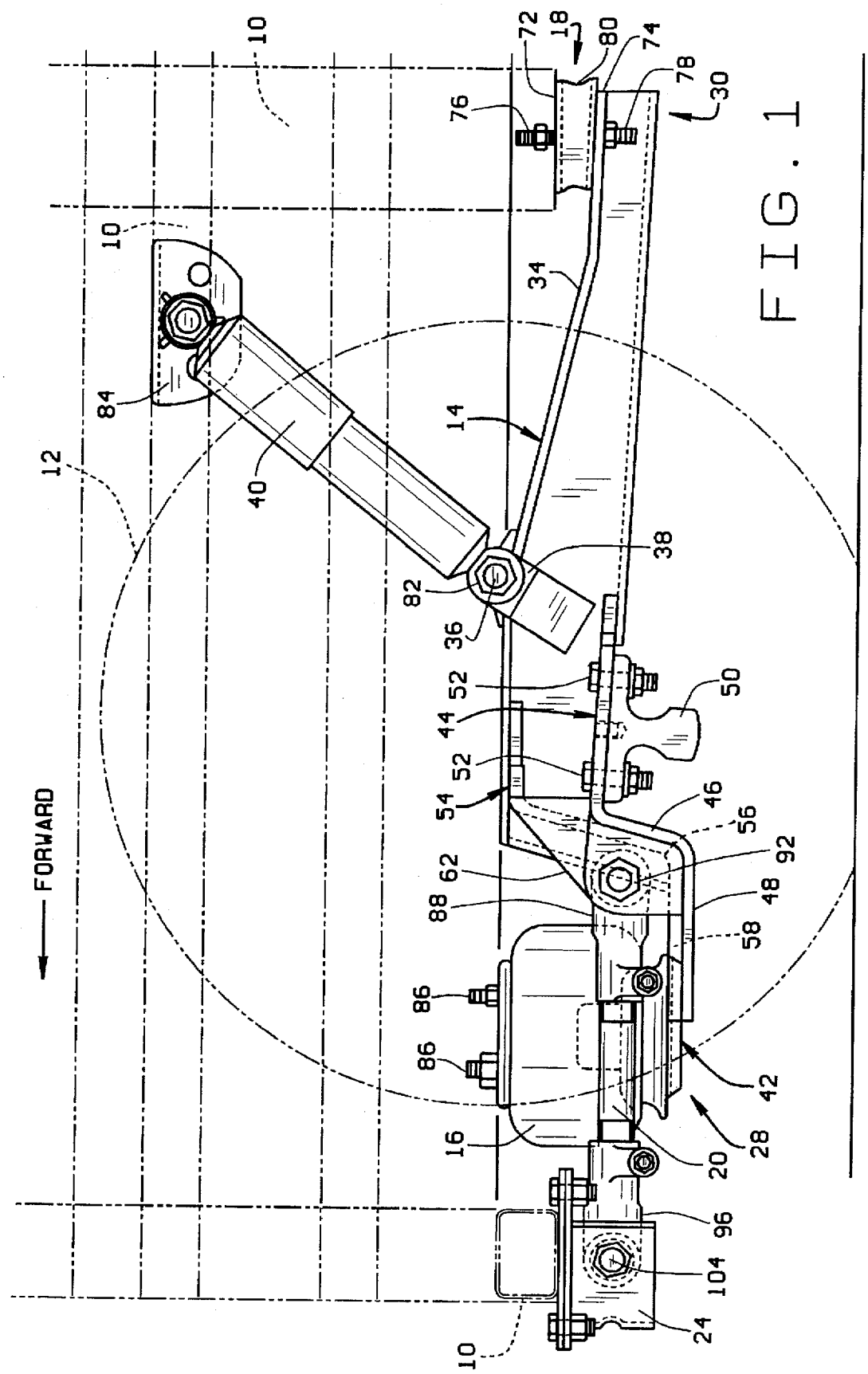
FIG. 1 is a side elevation view of the preferred embodiment of the vehicle suspension system of the present invention.

FIG. 1 shows the preferred embodiment of the suspension system of the invention. The system shown in FIG. 1 is only the vehicle left side suspension system. It should be understood that a mirror image suspension system is employed on the right side of the vehicle chassis. In FIG. 1, the vehicle chassis 10 is represented schematically by dashed lines and the vehicle front wheel 12 is also represented schematically by dashed lines. The particular configuration of the chassis represented in FIG. 1 and in the remaining drawing figures is illustrative only and does not comprise part of the suspension system of the invention nor is it intended to limit the suspension system of the invention to any particular form of vehicle chassis. As shown in FIG. 1, the vehicle forward end is to the left and the rearward end is to the right. The suspension system shown is that for the front axle which extends entirely across the width of the vehicle chassis. Although the suspension system may be employed with segmented axles, it is designed to remedy front end diving of vehicles with axles that entirely traverse the vehicle.

The suspension system of FIG. 1 is basically comprised of a beam 14, an air spring 16, a resilient, elastic buffer connector 18, a pair of radius rods 20, 22 and a pair of hangers 24, 26.

The torque beam 14 has opposite forward 28 and rearward 30 ends. The specific construction of the beam is best seen in the isometric views of FIGS. 2a and 2b. As seen in those figures, the torque beam 14 has a general rectangular cross-section configuration. A hole 32 is provided in the beam top surface 34 adjacent the rearward end of the beam for attachment of the buffer connector 18. A stub shaft 36 is also attached to the beam top surface 34 by reinforcing web members 38. The stub shaft 36 is connected to the shock absorber of the suspension system.

A substantially horizontal plate 42 is attached at the beam forward end 28. The plate 42 is comprised of a lower layer 44 that is secured to an underside of the beam forward end 28. The lower layer 44 extends forwardly from the beam and then through a downwardly directed section 46 of the plate. From the downwardly directed section 46, the lower plate then again extends through a generally horizontally directed section 48 to the end of the lower plate layer. The vehicle axle 50 is secured to the underside of the plate lower layer 44 by a plurality of nut and bolt fasteners 52.

Figure 2A:
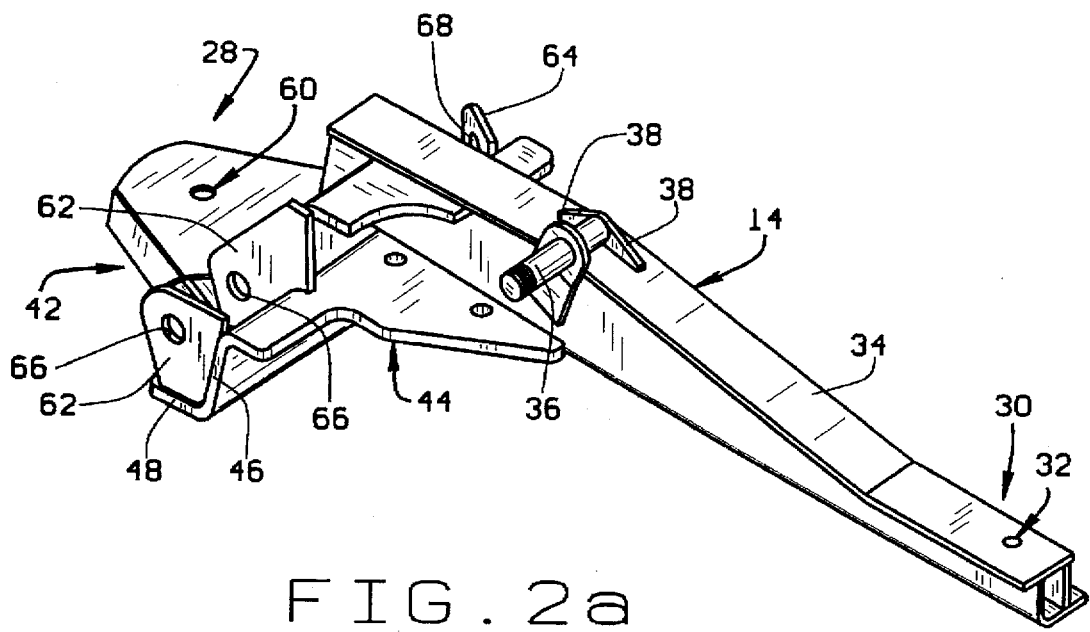
FIGS. 2a and 2b are isometric views of the torque beam shown in FIG. 1.
Figure 2B:
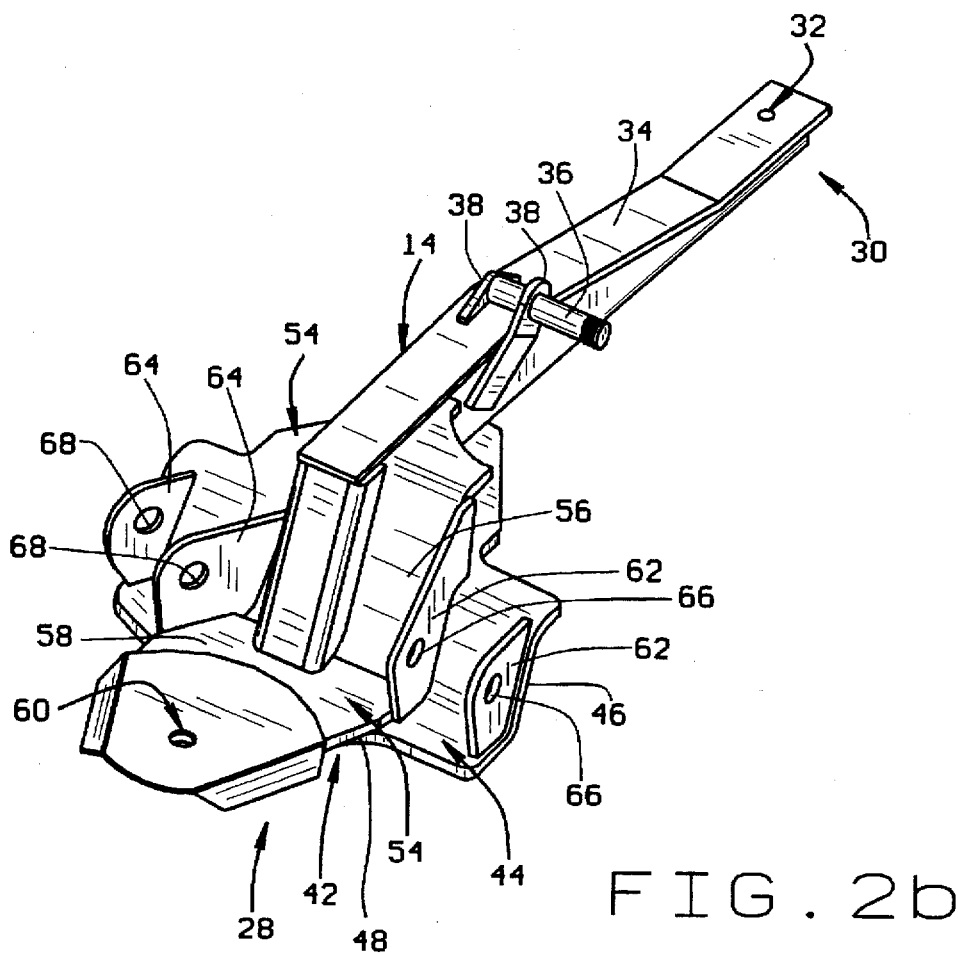

The plate 42 also includes an upper plate layer 54 that is attached to the beam top surface 34. The upper plate layer 54 extends forwardly from the beam top surface and then downwardly through a downward section 56 of the layer. From the downwardly extending section, the upper plate layer then again extends forwardly and substantially horizontally through a horizontal section 58 of the layer. The upper plate horizontal section 58 is welded to the lower plate horizontal section 48 below it, and together these two horizontal sections form the forward end 28 of the torque beam 14. As seen in FIGS. 2a and 2b, the plate 42 has a hole 60 at its center for attachment of the air spring 16.

Attached to the top surface of the plate 42 are two pairs of generally vertical webs 62, 64. The webs of each pair are spaced laterally from each other a sufficient distance to accommodate the end of a radius rod 20, 22 between each pair of webs. Each pair of webs 62, 64 has coaxial holes 66, 68 respectively, employed in the attachment of a radius rod between the pair of webs.

The torque beam rearward end 30 is connected to the underside of the vehicle chassis 10 by the elastic, resilient buffer connector 18. A cross-section of the connector is shown in FIG. 3. The connector has a vertical center axis 70 and is symmetric around this axis, giving the connector a general cylindrical configuration. The connector includes a circular upper plate 72 and a circular lower plate 74. A pair of threaded bolts 76, 78 extend through center holes in each of these respective plates 72, 74. A rubber center section 80 is adhered between the two mutually opposed surfaces of the plates. As seen in the drawings, the rubber center section 80 has a general hourglass shaped configuration. In the preferred embodiment of the connector, the rubber durometer of the center section 80 is 55+/−5 shore. The maximum compressive load of the center section is 7,400 pounds and the maximum tension load is 5,500 pounds. The lower bolt 78 of the connector is inserted through the hole 32 at the torque beam's rearward end 30 and is connected to the beam by a nut fastener. The opposite upper bolt 76 is inserted through a hole in a member of the chassis 10 to secure the connector to the chassis, and thereby secure the beam to the chassis at its rearward end. The rubber center section 80 of the connector permits the torque beam 14 to pivot about its rearward end 30 in a longitudinal plane, or the plane of FIG. 1, relative to the vehicle chassis. The rubber center section also permits the torque beam 14 to move horizontally, or in the horizontal plane of FIG. 4, relative to the vehicle chassis. The connector 18 provides the operative connection between the beam rearward end 30 and the vehicle chassis 10 in the preferred embodiment of the invention. However, as will be explained, other operative connections may be employed in other embodiments of the invention.

As shown in FIGS. 1 and 4, the shock absorber 40 is connected to the stub shaft 36 of the torque beam by a threaded nut connector 82. The upper end of the shock absorber 40 is connected to a bracket 84 that is mounted to the chassis 10.

Extending forwardly further along the length of the torque beam 14, the vehicle axle 50 is connected to the underside of the beam by the plurality of connectors 52. Forward of the axle is the plate 42 comprised of the upper 54 and lower 44 layers. As stated earlier, the plate comprises the beam forward end 28.

A conventional air spring 16 is connected to the beam forward end 28 by a bolt connector on the underside of the air spring (not shown) being inserted through the plate hole 60 and secured on its underside by a threaded nut (not shown). The top of the air spring 16 is secured to an underside of the vehicle chassis 10 by a pair of bolt and nut connectors 86.

Rearward ends 88, 90 of the two radius rods 20, 22 are connected to the forward end of the beam between the webs 62, 64. As shown in FIGS. 1 and 4, the rearward end 88 of the outboard radius rod is connected for pivoting movement between the outboard pair of webs 62 by a nut and bolt connector 92. The rearward end 90 of the inboard radius rod 22 is connected for pivoting movement between the inboard vertical webs 64 by another nut and bolt connector 94. The outboard 20 and inboard 22 radius rods extend forwardly from their pivot connections to the torque beam 14 to respective forward ends 96, 98 of the rods.

The forward ends of the two radius rods are connected between side walls of an outboard hanger 24 and inboard hanger 26 that are welded to the underside of a member of the vehicle chassis 10. The radius rod forward ends 96, 98 are connected between the walls of the respective outboard 24 and inboard 26 hangers by nut and bolt connectors, 104, 106, permitting pivoting movement of the radius rod forward ends relative to their hangers. As best seen in FIG. 4, the outboard radius rod 20 extends forwardly from the torque beam 14 substantially parallel to the vehicle longitudinal axis 108. The inboard radius rod 22 extends forwardly from the torque beam 14 at an angle relative to the longitudinal center axis 108 of the vehicle. The outboard radius rod 20 limits the movement of the torque beam 14 in a vertical plane and the inboard radius rod 22 limits the movement of the torque beam 14 in a horizontal plane.

Figure 5:
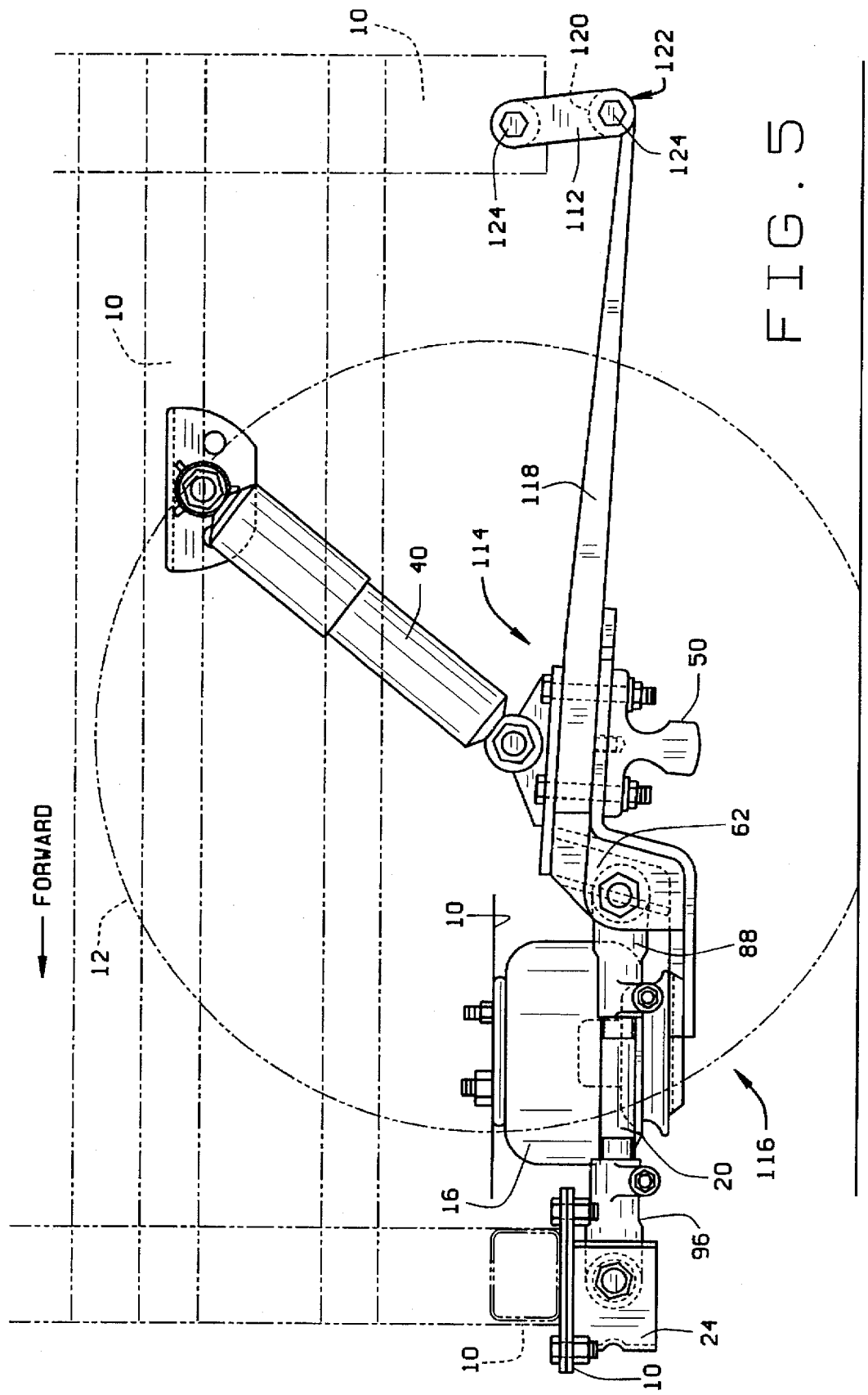
FIG. 5 is a side elevation view of a further embodiment of the suspension system.

FIG. 5 shows a further embodiment of the suspension system of the invention. Many of the component parts of the system shown in FIG. 5 are identical to those employed with the embodiment of the invention shown in FIGS. 1-4. Therefore, these component parts are identified by the same reference numbers employed in describing the component parts of the first embodiment of the invention. The embodiment of FIG. 5 differs from the previous embodiment principally in the substitution of a shackle connector 112 for the buffer connector 18 of the previous embodiment, and the construction of the torque beam 114 as a leaf spring as opposed to the box-shaped cross-section construction of the beam of the previous embodiment.

The torque beam forward end 116 has a construction substantially identical to that as the previously described embodiment and is connected to the vehicle chassis 10 in substantially the same manner as the previously described embodiment. Extending rearwardly from the beam forward end 116, the beam is constructed as a solid, metal leaf spring section 118. The plate upper layer 54 and lower layer 44 are attached to the leaf spring forward end. The pairs of vertical outboard webs 62 and inboard webs (not shown) are secured to the plate 42 in the same manner as the previous embodiment. The shock absorber 40 and vehicle axle 50 are also secured to the torque beam 114 in the same manner as the previous embodiment.

The leaf spring section 118 tapers as it extends rearwardly from the vehicle axle 50. An eyelet 120 is formed in the leaf spring rearward end 122.

The shackle connector 112 is conventional and is basically comprised of a pair of oblong plates having holes at their opposite ends. The lower ends of the plates 112 are positioned over the opposite ends of the leaf spring eyelet 120. A nut and bolt fastener 124 is inserted through the aligned lower holes of the shackle plates and the eyelet, providing a pivoting connection between the shackle 112 and the torque beam rearward end 122. The upper holes of the pair of shackle plates are positioned on opposite sides of a tubular bushing that is a part of the vehicle chassis 10 or aligned holes of the vehicle chassis and are secured in place by a nut and bolt fastener 124. This provides a pivoting connection between the shackle 112 and the chassis 10.

Figure 6:
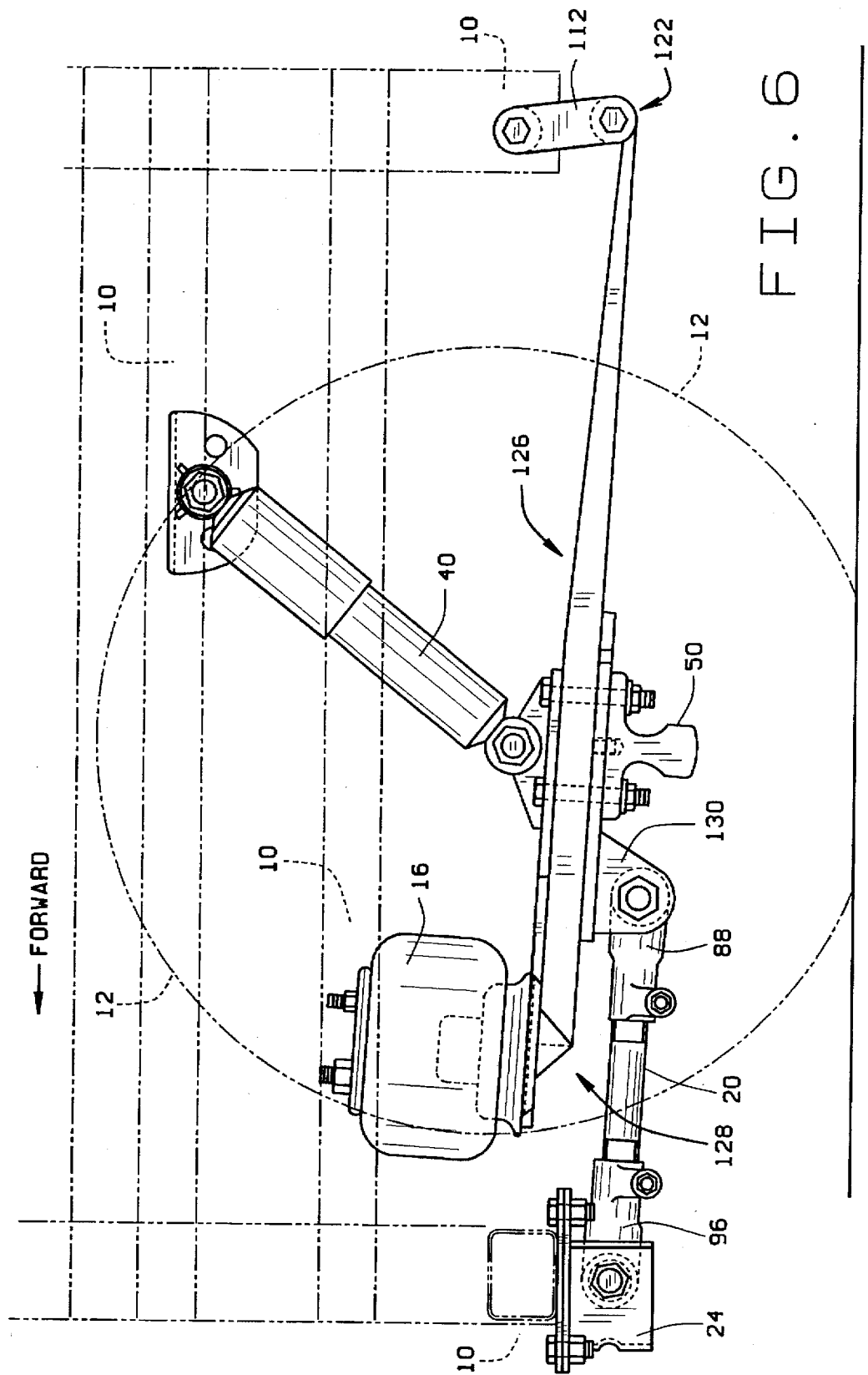
FIG. 6 is a side elevation view of a further embodiment of the suspension system.

The FIG. 6 embodiment is similar to the embodiment of FIG. 5 except that the entire length of the torque beam 126 is formed as a leaf spring. The rearward end 122 of the torque beam is connected to the chassis 10 by a shackle 112 just as in the previous embodiment. The torque beam 126 extends forwardly beyond the axle 50 and shock absorber 40 which are attached to an intermediate portion of the beam. The air spring 16 is connected between the vehicle chassis 10 and the forward end 128 of the torque beam. Two pairs of vertical webs 130 are connected to the underside of the torque beam 126 and the outboard and inboard 20, 22 radius rods are connected between these webs 130 and the hangers just as in the previously described embodiments.

Figure 7:
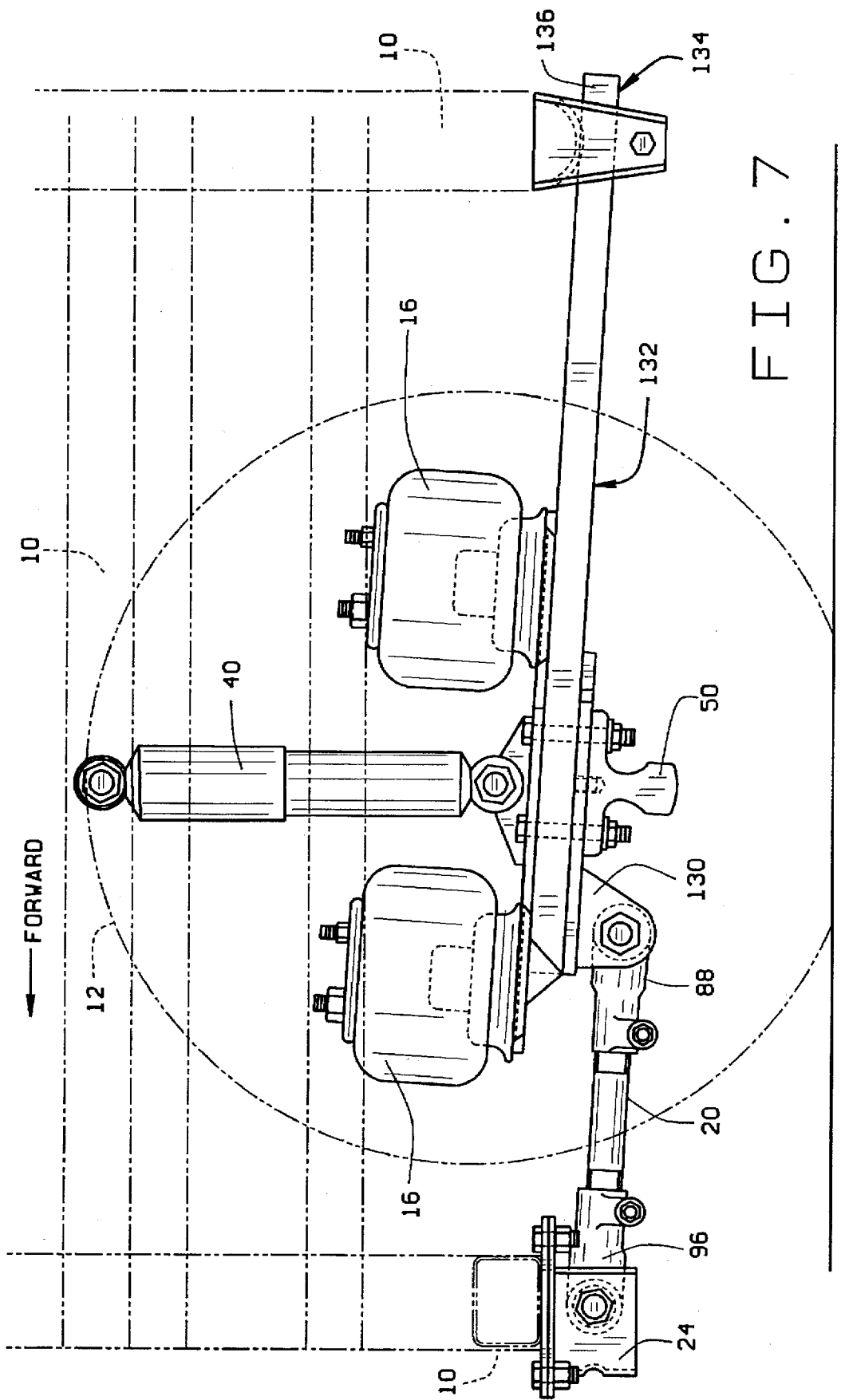
FIG. 7 is a side elevation view of a further embodiment of the suspension system.

The FIG. 7 embodiment of the suspension system of the invention is substantially identical to that of the FIG. 6 embodiment except that it employs tandem air springs 16 positioned on opposite sides of the shock absorber 40 and the vehicle axle 50. Furthermore, by employing tandem air springs 16, the taper of the torque beam 132 as it extends to its rearward end 134 is not as pronounced as the previously described leaf spring torque beam embodiments.

The torque beam rearward end 134 is operatively connected to the vehicle chassis 10 by a metal bearing pad 136 against which the top surface of the torque beam rearward end bears. The metal bearing pad 136 is of conventional construction and the remaining component parts of the suspension of FIG. 7 are substantially identical to those of previously described embodiments.

Each of the various embodiments of a suspension system of the invention shown in FIGS. 1-7 and described above have common design features. Each suspension system employs a torque beam having its forward end connected to the vehicle chassis by a pair of radius rods, one of the radius rods extending substantially parallel with the longitudinal axis of the vehicle and the other radius rod angling toward the center line of the vehicle. The rearward end of each torque beam is operatively connected to the vehicle chassis to permit pivoting movement of the torque beam about its rearward end in over-the-road operation of the suspension. The vehicle axle is connected to the torque beam, and in all embodiments of the invention an air spring is connected between the vehicle chassis and the forward end of the torque beam forwardly of the axle. The positioning of the air spring on the torque beam forward of the vehicle axle and the operative connection of the torque beam rearward end to the chassis in each of the above-described embodiments are the principal design features of the suspension system of the invention that enable it to reduce dynamic forces exerted on the air spring during vehicle braking and thereby reduce diving of the vehicle on braking.

The operation of the suspension system of the invention in reducing vehicle diving due to dynamic braking loads exerted on the suspension will now be explained with reference to FIGS. 8-10. In these drawing figures, a conventional air spring beam suspension system is employed on the vehicle rear axle shown to the left of the drawing figures, and the schematic representation intended to represent all of the embodiments of the invention described with reference to FIGS. 1-7 is shown employed on the front vehicle axle or the axle to the right as viewed in FIGS. 8-10.

FIG. 8 is a schematic representation of the static loads bore by the front and rear suspension systems of a typical vehicle. It should be understood that the dimensions and loads represented in FIG. 8 are for illustration purposes only, and are not intended to be limiting nor are they intended to represent that the suspension system of the invention will only work with a vehicle having the dimensions as shown in FIG. 8 and loaded as shown in FIG. 8. Furthermore, only the right side of the vehicle is shown in FIGS. 8–10. It should be understood that the loading of the suspensions on the left side of the vehicle will be identical.

In the example, the chassis 150 is representative of that of a vehicle designed to transport people having its motor to the rear of a vehicle or to the left as shown in FIG. 8. This results in a center of gravity CG that is spaced further to the rear of the vehicle. In this example, the wheel base is shown as 162 inches and the center of gravity CG of the vehicle is spaced 54 inches forward of the rear wheel 152 and 108 inches rearward of the front wheel 154. The total vehicle weight in the example is 27,000 pounds. With the spacing of the center of gravity CG from the rearward and forward wheels, 18,000 pounds of the vehicle weight is bore on the rear wheels 152 and 9,000 pounds of the vehicle weight is bore by the front wheels 154. Of the 18,000 pounds bore by the rear wheels, 12,000 pounds is bore by the rear air springs 156 and 6,000 pounds is bore by the bushings 158 that mounts the rear torque beam 160 to the vehicle hanger 162.

Of the 9,000 pounds bore by the front wheels 154 of the vehicle, 6,000 pounds is bore by the suspension system air springs 164 and 3,000 pounds is bore by the elastic, flexible buffer connectors 166. The radius rods 168 extending between the torque beam 170 and the hangers 172 carry no portion of the load.

The schematic of FIG. 9 is referred to in determining the dynamic braking reaction on the forward and rearward axles of the vehicle. In this example, a coefficient of friction ($f$) of 0.3 for the braking traction of the vehicle's wheels, 152, 154 is used. In determining the total force of braking traction, the vehicle weight of 27,000 pounds is multiplied by the coefficient of friction of 0.3, resulting in a braking traction force of 8,100 pounds acting through the center of gravity CG of the vehicle.

Next, the forward pitch moment at the roadway surface 178 is determined by multiplying the total braking traction force of 8,100 pounds by the distance of 54 inches, the height of the vehicle's center of gravity CG from the roadway surface in this example, resulting in a forward pitch moment of 437,400 inch pounds. The portions of the forward pitch moment that are transferred to the forward and rearward axles of the vehicle are determined by dividing the forward pitch moment of 437,400 inch pounds by the 162 inch wheel base of the vehicle, resulting in 2,700 pounds that is subtracted from the 18,000 pound static load on the rear wheel axle, and 2,700 pounds that is added to the 9,000 pound static load on the front wheel axle. This results in a dynamic braking load of 15,300 pounds on the rear wheels and 11,700 pounds on the front wheels.

From these dynamic braking loads exerted on the vehicle wheels, the braking traction load on the wheels is determined. The braking traction load for the rear wheels are determined by multiplying the 15,300 pound dynamic braking load by the wheel surface coefficient of friction of 0.3, resulting in a braking traction load for the rear wheels of 4,590 pounds. The braking traction load on the front wheels are determined by multiplying the 11,700 pound dynamic braking load on the front wheels by the coefficient of friction of the wheel surface of 0.3, resulting in a braking traction load of 3,510 pounds on the front wheels.

FIG. 10 is referred to in determining the dynamic braking reactions on the beams of the front and rear wheel suspensions. This schematic is used to determine the change in the static loading of the rear wheel air spring 156 and front wheel air spring 164 due to the dynamic braking forces.

First, the moments about the rear suspension bushing 158 are summed. The traction braking force of 4,590 is multiplied by the 9 inch distance of this force from the bushing. This product is added to the 15,300 pound dynamic load on the rear wheel multiplied by the 24 inch distance of this force from the bushing. The sum of these two moments equals the downward dynamic force exerted on the rear air spring 156, multiplied by the 36 inch distance of this air spring from the bushing 158. The result is the dynamic force on the air springs being 11,348 pounds. This is a five percent (5%) decrease from the static load of 12,000 pounds.

Next, to determine the load bore by the rear suspension bushings 158, the vertical force on the air springs, the vehicle wheel and the bushing are summed to equal zero. This results in the downward load bore by the bushings being equal to the difference of the 15,300 pound upward force on the vehicle rear wheels and the 11,348 pound downward force on the rear air springs, or a downward force of 3,952 pounds bore by the bushings. This represents a thirty-four percent (34%) decrease from the static load on the bushing.

With the decreases from static load bore by the air springs and bushings of the rear axle due to the braking of the vehicle, in a typical vehicle suspension a substantial increase in the load bore by the front suspension air springs would result, producing front end diving of the vehicle. However, with the novel construction of the suspension system of the invention employed on the vehicle front axle, the increase in dynamic braking load on the front axle air spring 164 is substantially reduced as will be explained, reducing front end diving of the vehicle.

The first step in determining the dynamic braking force exerted on the front axle air spring involves summing the dynamic braking load moments about a center point on the air springs so that the unknown force exerted on the air springs is not taken into consideration. Summing the moments about the air springs, the 11,700 pound dynamic force on the vehicle front wheels is multiplied by the 12 inch distance of this force from the center of the air springs. This product is added to the 3,510 pound braking traction load exerted on the vehicle wheels multiplied by the 11 inch distance of this force from the center of the air springs. The sum of these two products is equal to the downwardly directed force on the buffer connectors 166 multiplied by the 36 inch distance of this force from the center of the air springs. The result is that the downwardly directed load on the buffer connectors is 4,972.5 pounds.

Next, the vertical forces exerted on the suspension are summed to determine the downwardly directed force exerted on the front air springs 164. This force is equal to the difference in the 11,700 pound upward dynamic force exerted on the front wheels and the 4,972.5 pound downward directed dynamic force exerted on the buffer connectors. This results in a 6,727.5 pound downwardly directed force exerted on the front air springs, only a twelve percent (12%) increase from the 6,000 pound static force exerted on the front air springs.

From the above example, it can been seen that although the upwardly directed dynamic braking force of 11,700 pounds exerted on the front wheel is a thirty percent (30%) increase in the 9,000 pound static load on the wheel, a large portion of this force is resisted by the increase in the downwardly directed dynamic load of 4,972.5 pounds bore by the buffer connectors, a sixty-six percent (66%) increase from their static load of 3,000 pounds. The novel construction of the front wheel suspension system of the invention shown with its buffer connectors at its rearward end and the air springs positioned forwardly of the axle reduces the increase in dynamic load bore by the front axle air springs so that their dynamic load of 6,727.5 pounds is only a twelve percent (12%) increase of the 6,000 pound static load bore by the air springs.

Again, it is emphasized that the above example describing the operation of the suspension system of the invention is not intended to be limiting and that the forces and distances referred to in the example will differ for different vehicles employing the suspension system of the invention. However, in each application of the suspension system of the invention, its novel construction positioning the air spring forward of the vehicle axle and operatively connecting the rearward end of its torque beam to the vehicle chassis either by the preferred buffer connector, or the alternative shackle or wear plate connectors, will result in reducing the dynamic loads exerted on the front axle air spring during vehicle braking and thereby result in reducing front end diving of the vehicle during braking. Although the operation of the suspension system of the invention has been described above as being used on a front axle of a vehicle, it should be understood that the suspension system may be employed on a rear axle of a vehicle to reduce diving of the vehicle rearward end in response to acceleration of the vehicle.

While the present invention has been described by reference to a specific embodiment, it should be understood that modifications and variations of the invention may be constructed without departing from the scope of the invention defined in the following claims.

What is claimed:

1. A suspension system for a vehicle having a longitudinally extending chassis and at least one laterally extending axle with at least one wheel mounted thereon, the suspension system comprising:

a longitudinally extending beam with opposite forward and rearward ends, the axle is connected to the beam intermediate the beam forward and rearward ends, the rearward end of the beam is operatively connected to the chassis for limited vertical movement of the beam rearward end relative to the chassis;

a spring is connected between the forward end of the beam and the chassis where the spring is connected to the beam forward of the axle; and, a radius rod having longitudinally opposite forward and rearward ends is connected between the beam and the chassis, with the radius rod rearward end connected by a pivoting connection to the beam forward end and the radius rod forward end connected by a pivoting connection to the chassis.

2. The suspension system of claim 1, wherein:

the spring is an air spring.

3. The suspension system of claim 1, wherein:

the axle is a forward axle of the vehicle.

4. The suspension system of claim 1, wherein:

the beam rearward end is operatively connected to the chassis by an elastic buffer connected between the beam rearward end and the chassis.

5. The suspension system of claim 1, wherein:

the beam rearward end is operatively connected to the chassis by a shackle connected between the beam rearward end and the chassis.

6. The suspension system of claim 1, wherein:

the beam is a leaf spring.

7. The suspension system of claim 1, wherein:

the beam extends forwardly from its rearward end to the connection of the beam to the axle, the beam then extends downwardly as it extends forwardly of the beam connection to the axle to the beam forward end and to the spring connected to the forward end.

8. The suspension system of claim 1, wherein:

the radius rod is the first of a pair of radius rods, and a second radius rod of the pair is also connected between the beam and the chassis, with a rearward end of the second radius rod connected by a pivoting connection to the beam forward end, and a forward end of the second radius rod connected by a pivoting connection to the chassis.

9. A suspension system for a vehicle, the suspension system comprising:

a beam having a rearward end operatively connected to the vehicle for vertical movement of the beam rearward end relative to the vehicle, the beam extending from its rearward end toward a forward end of the vehicle to an axle of the vehicle connected to the beam, and the beam extending from the axle toward the forward end of the vehicle to a spring connected to the beam, the spring operatively connecting the beam to the vehicle; and, a radius rod having a rearward end connected to the beam by a pivoting connection for pivoting movement of the radius rod rearward end relative to the beam, and the radius rod having a forward end connected to the vehicle by a pivoting connection for pivoting movement of the radius rod forward end relative to the vehicle.

10. The suspension system of claim 9, wherein:

the axle connected to the beam is spaced forwardly of the beam rearward end and the spring connected to the beam is spaced forwardly of the axle.

11. The suspension system of claim 10, wherein:

the radius rod is connected to the beam forwardly of the axle.

12. The suspension system of claim 11, wherein:

the radius rod is the first of a pair of radius rods, and a second radius rod of the pair is also connected between the beam and the vehicle, with a rearward end of the second radius rod connected to the beam forward of the axle by a pivoting connection, and a forward end of the second radius rod connected to the vehicle by a pivoting connection.

13. The suspension system of claim 10, wherein:

the spring is an air spring.

14. The suspension system of claim 10, wherein:

the rearward end of the beam is operatively connected to the vehicle by an elastic buffer.

15. The suspension system of claim 14, wherein:

the buffer is connected between an upwardly facing surface of the beam and a downwardly facing surface of the vehicle where the buffer is subjected to compression forces and tensile forces.

16. The suspension system of claim 15, wherein:

the buffer is connected between the upwardly facing surface of the beam and the downwardly facing surface of the vehicle where the buffer is subjected to shear forces.

17. The suspension system of claim 9, wherein:

the beam is a leaf spring.

18. A suspension system for a vehicle, the suspension system comprising:

a beam having a rearward end operatively connected to the vehicle for movement of the beam rearward end relative to the vehicle, the beam extending from its rearward end toward a forward end of the vehicle to an axle of the vehicle connected to the beam and to a spring connected between the beam and the vehicle;

the axle connected to the beam is spaced forwardly of the beam rearward end and the spring connected to the beam is spaced forwardly of the axle;

and a radius rod having opposite forward and rearward ends is connected between the vehicle and the beam with the radius rod forward end connected to the vehicle by a pivoting connection and the radius rod rearward end connected to the beam forward of the axle by a pivoting connection.

19. The suspension system of claim 18, wherein:

the radius rod is the first of a pair of radius rods, and a second radius rod of the pair is also connected between the beam and the vehicle, with a rearward end of the second radius rod connected to the beam forward of the axle by a pivoting connection, and a forward end of the second radius rod connected to the vehicle by a pivoting connection.

20. The suspension system of claim 19, wherein:

the beam has a forward end that projects toward the forward end of the vehicle from the vehicle axle, and the rearward ends of the first and second radius rods are both connected to the beam forward end.

* * * * *